Figure 1:
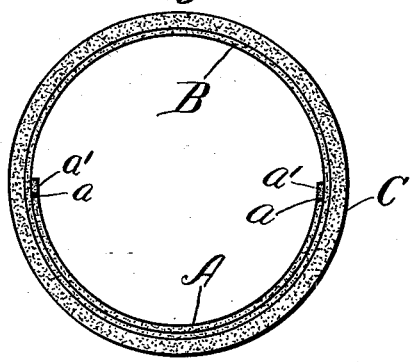

(No Model.) 2 Sheets—Sheet 1.

E. W. YOUNG.
PNEUMATIC TIRE.

No. 543,074. Patented July 23, 1895.

Witnesses:
Arthur H. Osmand
Margaret M. Wagner

Inventor:
Ernest W. Young.
By Chas. J. Page, Atty

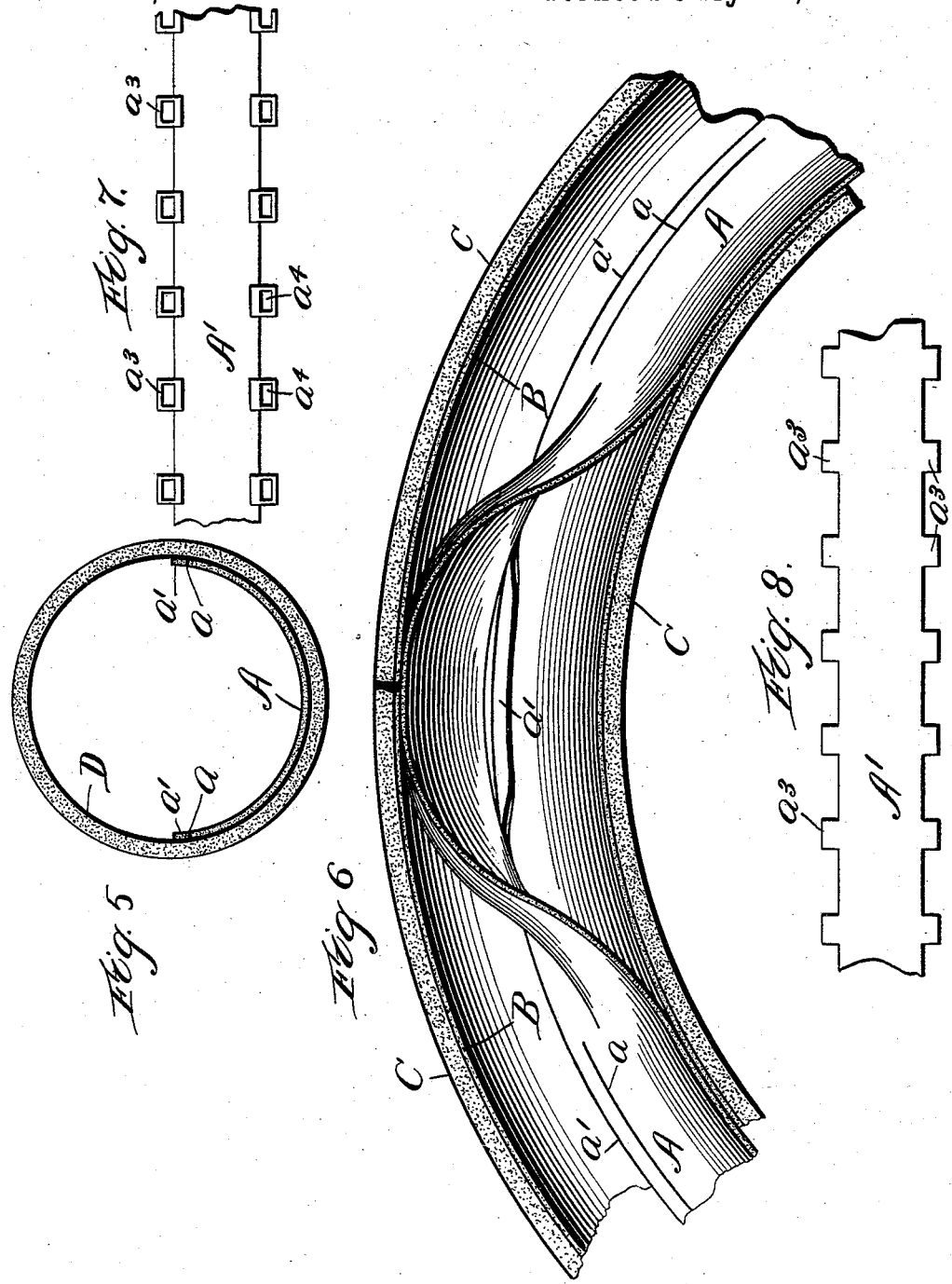

UNITED STATES PATENT OFFICE.

ERNEST W. YOUNG, OF AUSTIN, ASSIGNOR TO THE MORGAN & WRIGHT, OF CHICAGO, ILLINOIS.

PNEUMATIC TIRE.

SPECIFICATION forming part of Letters Patent No. 543,074, dated July 23, 1895.

Application filed May 22, 1895. Serial No. 550,292. (No model.)

*To all whom it may concern:*

Be it known that I, ERNEST W. YOUNG, a citizen of the United States, residing at Austin, in the county of Cook, State of Illinois, have invented a certain new and useful Improvement in Pneumatic Tires, of which the following is a specification.

My invention relates to pneumatic tires involving the matters described in Letters Patent of the United States, No. 527,097, granted and issued to me October 9, 1894, and comprising a patching-ply, a strip which is arranged to extend longitudinally within the tire and attached along its longitudinal edge portions to the inner wall of the tire, whether such inner wall be the inner side of an air-tube inclosed in a sheath or the inner wall of a one-tube tire, provision being made for apertures at or adjacent to the longitudinal edge portions of the patching ply or strip, so as to permit the internal pressure to be equally distributed and balanced within the tire when a portion of the patching ply or strip is picked up and cemented to a punctured part of the tread portion of the tire and the latter inflated.

Prominent objects of my present invention are to simplify and cheapen the production of such repairable tires; to produce them rapidly and economically; to avoid objectionable puckers or wrinkles in the patching ply or strip and thereby permit it to be successfully used at any point along its length for closing a puncture in the tire and to provide light flexible and elastic hinge connections between the body of the ply or strip and the inner wall of the tire, so as to permit the ply or strip at any desired point or points along its length to be picked up by the inner side of the tread portion of the tire, it being understood that the inner wall of the tire may be the inner side of an inner inflatable air-tube or the inner side of a one-tube tire.

In carrying out my invention I provide the patching ply or strip with marginal attaching portions which are in part separate from or independent of the body of the strip, so as to form light and flexible hinge connections arranged at intervals along the strip. These hinge connections or attaching portions are also desirably elastic. As a preferred and special mode of providing the strip with attaching portions of such character I simply provide the ply or strip with slits at points along its longitudinal edge portions, thereby forming comparatively-narrow attaching portions which are partially separated from the body of the ply or strip by the splits or cuts, which latter may be in the nature of slots, if desired, although the simpler and preferred way is to simply slit the ply or strip at desired points. By this arrangement I provide the ply or strip with light flexible attaching portions and at the same time economize in material, since I employ no extra stock, and as a simple and economical way of rendering such attaching portions elastic I can simply form the ply or strip of thin elastic material, such as rubber.

The elasticity of the attaching portions of the ply or strip admit of easy lateral stretch on the part of such attaching portions preparatory to connecting them with the exterior surface of a distended air-tube, which latter can be subsequently turned so as to bring the ply or strip inside the tube, in which way the ply or strip will lie smoothly within the tube, for the reason that the portions of the ply or strip which are stretched when the latter is on the outside of the tube, and consequently on the largest circle, will shrink and thereby take up all puckers or wrinkles when the tube is turned so as to bring the ply or strip inside and on a smaller circle, as hereinafter more fully described.

Figure 2:
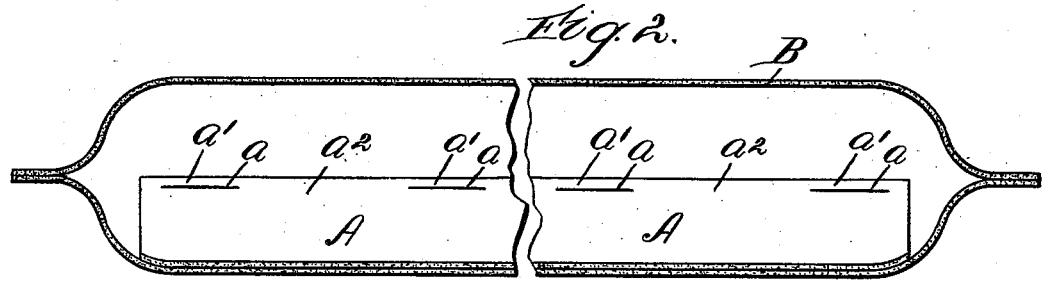
Figure 3:
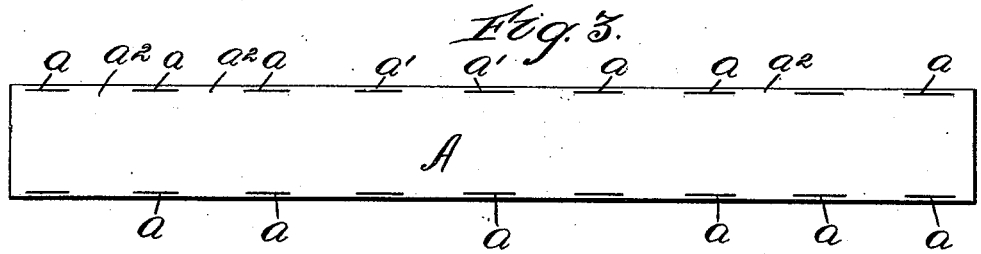
Figure 4:
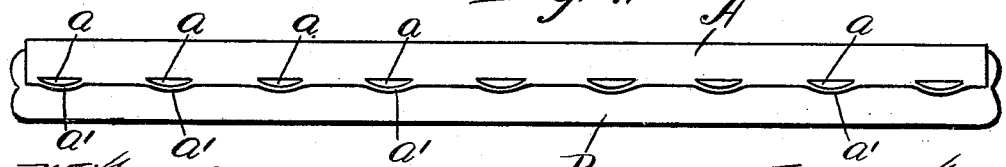

In the accompanying drawings, Figure 1 is a section taken transversely through a pneumatic tire, comprising a sheath or casing, an inner inflatable tube, and a patching ply or strip arranged within the inflatable tube in accordance with my invention. Fig. 2 is a section taken longitudinally through an inner inflatable tube, with the patching ply or strip secured therein, the middle portion of the tube being broken away for convenience of illustration. Fig. 3 shows a strip adapted to provide a patching ply or strip for a pneumatic tire and slitted at points along its longitudinal edge portion. Fig. 4 illustrates an inner inflatable tube turned inside out and having the patching ply or strip applied preparatory to again turning the tube, it being observed that for convenience of illustration the tube is shortened in length. Fig. 5 is a section taken transversely through a one-tube tire containing the patching ply or strip. Fig. 6 is a section taken longitudinally through a portion of a pneumatic tire containing a patching ply or strip in accordance with my invention, a portion of the patching ply or strip being shown picked up so as to close a puncture in the tire. Figs. 7 and 8 represent portions of a ply or strip having laterally-extending attaching portions.

The patching ply or strip A is provided with short longitudinally-arranged slits $a$ formed through the strip at points near its longitudinal edges. This ply or strip is formed of some thin flexible material, it being by preference of vulcanized rubber or rubber compound, although an imitation rubber compound could be employed.

The operation of slitting the strip or web can be rapidly and economically performed; and to such end it will only be necessary to pass the strip between a couple of rapidly-rotating rolls, whereof one is provided with one or more cutters arranged for making the slits at suitable distances apart. By thus slitting the strip or web it will have at intervals along its length certain edge portions $a'$, which will readily stretch and which can be drawn laterally away from the body of the web. In order to apply this slitted ply or strip to an inner inflatable tube B for a pneumatic tire, the tube is desirably distended or filled out to the condition or to about the condition it will be in when inflated within the sheath or casing, a simple and convenient way of distending the tube being to insert a rod or mandrel within the same. The ply or strip A is then laid upon the tube, and its edge portions $a'$ are then drawn laterally away from the body of the web and cemented upon the tube, as illustrated in Fig. 4, it being understood that such operation will stretch said edge portions $a'$ of the ply or strip, particularly at the junction between their ends and the body or main portion of the ply or strip, and that the edge portions $a'$ are not to be cemented at their said end portions, whereby the latter will remain in a stretched condition until the tube is turned to bring the ply or strip inside the same. Obviously, the patching ply or strip thus applied to the distended tube will lie in a circle having a greater radius than the radius of the circle in which the ply or strip will lie after the tube has been turned, so as to bring the ply or strip inside, and distended by inflation. It will also be seen that owing to such difference in the two circles the ply or strip when brought inside of the tube, as a result of turning the latter, would pucker, unless provision is made for taking up such surplus slack or puckers; but by stretching the ply or strip at points between its main or body portion and the points at which it is cemented to the air-tube, as hereinbefore described, and then turning the tube so as to bring the ply or strip inside, the said ply or strip will, when thus brought inside of the tube, contract at its previously-stretched portions, and will therefore adapt the ply or strip transversely to the inner circle and take up all wrinkles or puckers. When, therefore, any portion of the ply or strip, which normally lies away from the tread side of the tire, is cemented to a punctured portion of the tire at its said tread side, as in Fig. 6, the portion of the ply or strip thus cemented will be smooth and will therefore effectively and with certainty close up the puncture.

As a simple way of providing air-passages between opposite sides of the patching ply or strip, so as to admit of a free circulation of air through the bore or passage within the tire, when one or more portions of the ply or strip are cemented to and picked up by a punctured portion of the tire, as in Fig. 6, the marginal-edge portions $a^2$ of the ply or strip which intervene between the slitted portions are not cemented to the inner wall of the air-tube, although, if preferred, the apertures or passages could be formed directly in the ply or strip.

The patching ply or strip normally lies away from the tread side of the tire, and hence will be out of the way and not liable to puncture. When a puncture occurs in the tread side of the tire, cement is introduced through the puncture thus made, and the punctured portion of the tire (in a deflated condition) is depressed so as to unite with the ply or strip, which will adhere to the depressed portion of the tire by reason of the previously-introduced cement, and upon again inflating the tire such cemented portion of the ply or strip will be picked up, as in Fig. 6. The edge portions $a'$ provide flexible hinge connections between the strip and tire, and will therefore permit the strip to be easily picked up, as in said Fig. 6.

Where the inflatable inner tube is made with closed ends—for example, flattened closed ends—it can be first turned inside out through the hole usually left for the flexible nipple, a tube thus turned being illustrated in Fig. 4, wherein the flattened ends are understood to project inwardly, and after applying the patching ply or strip the tube can be again turned. In other cases, however, where twice turning the tube is not required, the ply or strip can be applied upon the tube and the latter can then be turned so as to bring the ply or strip inside the tube.

The tube B can be arranged within a sheath or casing C, as in Figs. 1 and 6, and when thus arranged the patching ply or strip will normally lie away from the tread portion of the tire, so as not to be injured when a puncture is made in the tire. A portion of the ply or strip, at any point along its length, can, however, be picked up and cemented to a punctured portion of the tube, as in Fig. 6, the ply or strip being sufficiently slack for such purpose. The patching ply or strip can also be arranged within and attached to the inner wall of a one-tube pneumatic tire D, as in Fig. 5. The ply or strip can be made in two or more lengths, the simplest way being, however, to form it of a single length.

The patching ply or strip A' in Figs. 7 and 8 is provided with attaching portions $a^3$, which can be slotted, as in Fig. 7, or formed without slots, as in Fig. 8. These attaching portions $a^3$ can be made integral with the body of the ply or strip or they can be made separately therefrom and cemented or otherwise secured thereto. The attaching portions $a^3$ are desirably both flexible and elastic, and hence can be stretched for the purpose that the attaching portions $a'$ shown in preceding figures are desirably made elastic. The ply or strip shown in Figs. 7 and 8 can be placed upon the distended tube and the attaching portions can be then cemented upon the tube, leaving parts of the stretched portions uncemented. The tube can then be turned inside out, so as to bring the ply or strip within the tube, as hereinbefore described, in connection with the ply or strip having slits. To make the attaching portions separate from the ply or strip and then secure them to the same is not as desirable as the modes of making the ply or strip and attaching portions integral, since it requires more time and labor to make the attaching portions separate and then secure them to the ply or strip. By making slots or slits $a^4$ in the attaching portions $a^3$ the latter can be easily stretched and light hinge connections can thereby be attained, it being also observed that in place of the slits $a^4$ I could make slots in the ply or strip. In practice, however, I prefer to simply provide the ply with slits $a$, which arrangement I regard as a matter of further and decided improvement, it being also the simplest and most economical. It will be seen, however, that to provide a pneumatic tire with a ply or strip having attaching portions $a'$ or a ply or strip having attaching portions $a^3$ involves a patching ply or strip provided at intervals along its length with marginal attaching portions, which are partially independent of or partially separated from the body of the ply or strip and secured to the inner wall of the tire, (whether such wall be the inner side of an inner air-tube or the inner wall of a one-tube tire,) thereby providing flexible hinge connections between the inner wall of the tire and the body or main portion of the patching ply or strip, and that by making the attaching portions in either case elastic the hinge connections or attaching portions will be both flexible and elastic, so as to be capable of stretching, for purposes hereinbefore set forth.

What I claim as my invention is—

1. The combination with a pneumatic tire, of an internally and longitudinally arranged patching ply or strip provided at intervals along its length with attaching portions which are partially independent of the body of the ply or strip and secured to the inner wall of the tire so as to provide flexible hinge-connections between the inner-wall of the tire and the body of the patching ply or strip, substantially as set forth.

2. The combination with a pneumatic tire, of an internally and longitudinally arranged patching ply or strip provided at intervals along its length with elastic attaching portions which are partially independent of the body of the ply or strip and secured to the inner wall of the tire so as to provide elastic and flexible hinge-connections between the inner wall of the tire and the body of the patching ply, substantially as described.

3. An inflatable inner tube for a pneumatic tire, provided with an internally arranged flexible patching ply or strip having attaching portions which are partially separate from the body of the ply or strip by cuts or slits formed in such ply or strip, and said attaching portions being attached to the inner wall of the said air-tube so as to form flexible hinge connections, substantially as set forth.

4. An inflatable inner-tube for a pneumatic tire provided with an internally arranged flexible patching ply or strip having elastic attaching portions which are partially separated from the body of the ply or strip by cuts or slits formed in the latter, and which are attached to the inner wall of said tube so as to provide flexible and elastic hinge connections, substantially as set forth.

5. An inflatable inner tube for pneumatic tires having closed ends and provided with an internally arranged flexible patching-ply or strip having cuts or slits along its longitudinal edge portions and having its marginal portions $a'$ alongside the cuts or slits attached to the inner wall of the said tube, substantially as described.

6. The within described method of preparing repairable inner elastic tubes for pneumatic tires, consisting in distending the tube, arranging thereon a patching-ply or strip, partially stretching the strip at intervals along its longitudinal edge portions, cementing parts of the stretched portions to the tube so as to leave stretched parts between the points of securement and the body of the ply or strip, and turning the tube so as to bring the ply or strip within the same.

ERNEST W. YOUNG.

Witnesses:
ARTHUR F. DURAND,
MARGARET M. WAGNER.